US009462486B2

(12) United States Patent
Luo et al.

(10) Patent No.: US 9,462,486 B2
(45) Date of Patent: Oct. 4, 2016

(54) METHOD AND DEVICE FOR CLASSIFYING WIRELESS DATA SERVICE

(75) Inventors: Xuyao Luo, Shenzhen (CN); Liangbin Li, Shenzhen (CN); Guomian Cheng, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 412 days.

(21) Appl. No.: 13/876,964

(22) PCT Filed: Apr. 28, 2011

(86) PCT No.: PCT/CN2011/073443
§ 371 (c)(1),
(2), (4) Date: Apr. 15, 2013

(87) PCT Pub. No.: WO2012/041063
PCT Pub. Date: Apr. 5, 2012

(65) Prior Publication Data
US 2013/0223263 A1   Aug. 29, 2013

(30) Foreign Application Priority Data

Sep. 30, 2010   (CN) .......................... 2010 1 0503553

(51) Int. Cl.
*H04W 24/00* (2009.01)
*H04W 24/02* (2009.01)
*H04W 24/08* (2009.01)
*H04W 28/24* (2009.01)

(52) U.S. Cl.
CPC .............. *H04W 24/02* (2013.01); *H04W 24/08* (2013.01); *H04W 28/24* (2013.01)

(58) Field of Classification Search
CPC ............... H04L 29/6027; H04L 43/16; H04L 41/5067; H04L 24/08; H04L 24/10; H04W 24/02; H04W 28/24; H04W 24/08
USPC ............................... 370/252; 455/404.2, 405
See application file for complete search history.

(56) References Cited

U.S. PATENT DOCUMENTS 7,023,802 B2 *   4/2006   Kawahata et al. ............ 370/235
8,315,166 B2 *   11/2012   Wang .............................. 370/230
2007/0008929 A1 *   1/2007   Lee et al. ....................... 370/331

(Continued)

FOREIGN PATENT DOCUMENTS

| CN | 101043689 A | 9/2007 |
| CN | 101594622 A | 12/2009 |
| CN | 101959308 A | 1/2011 |

OTHER PUBLICATIONS

English translation of International Search Report for corresponding PCT/CN2011/073443, dated Aug. 4, 2011; 3 pages.

(Continued)

Primary Examiner — Christopher Grey

(57) ABSTRACT

A method and a device for classifying wireless data service are provided in the disclosure. The method comprises the following steps of: calculating Key Performance Indicators KPIs of the wireless call information, matching the calculated KPIs with the service model which is preset, and determining a service type of a call. The disclosure may quickly and accurately differentiate the actual IP service type of a user without increasing the system load at a base station or a core network, so that the quality of service of a wireless network is improved and the resource may be distributed reasonably.

20 Claims, 2 Drawing Sheets

(56) References Cited

U.S. PATENT DOCUMENTS

| | | | |
|---|---|---|---|
| 2007/0049243 A1* | 3/2007 | Voss | 455/405 |
| 2009/0003227 A1* | 1/2009 | Malomsoky et al. | 370/252 |
| 2009/0111382 A1* | 4/2009 | Yao | 455/67.7 |
| 2009/0227251 A1* | 9/2009 | Lei et al. | 455/425 |
| 2010/0077077 A1* | 3/2010 | Devitt | 709/224 |
| 2011/0188457 A1* | 8/2011 | Shu et al. | 370/329 |
| 2012/0072267 A1* | 3/2012 | Gutierrez, Jr. | G06Q 10/063 705/7.39 |

OTHER PUBLICATIONS

English translation of the Written Opinion of the International Searching Authority for corresponding PCT/CN2011/073443; dated Jul. 22, 2011; 5 pages.

* cited by examiner

METHOD AND DEVICE FOR CLASSIFYING WIRELESS DATA SERVICE

FIELD OF THE INVENTION

The disclosure relates to the wireless data communication technology field, and in particular to a method and a device for classifying wireless data service.

BACKGROUND OF THE INVENTION

With the popularization of 3G applications, the service subject of the wireless network gradually shifts to data service; more and more users enjoy the data service with terminals, for example, watching videos, browsing websites and sending emails etc. For different application characteristics, each of data services varies greatly in the resource occupancy of wireless network, for example, usually online time of a user who uses MSN (Microsoft Service Network) is more than that of a user who downloads files, however, flux of the user who uses MSN may be only one percent of that of the user who downloads files; meanwhile, different data services have different requirements for wireless environment. To improve the service quality of wireless network and realize reasonable resource distribution, it is necessary to accurately classify all kinds of data services at the base station level.

In the traditional art, on a core network side, the application type in the IP network is analyzed, by collecting IP information, with an IP network monitoring tool according to different data flux of different IP network application types. However, on a network side, it is impossible to correspond the IP network application type with the type of wireless data at a base station; on an traditional base station side, the wireless resource management tools may monitor the distribution of wireless data resource effectively, and analyze the data types of different wireless users, but may not obtain the IP network application information of the users, so the analysis of the IP network application type may not be carried out.

Therefore, it is impossible to improve the service quality of the wireless network and realize reasonable resource distribution by means of the traditional technology.

SUMMARY OF THE INVENTION

In view of this, the disclosure provides a method and a device for classifying wireless data service which enable the IP network application type corresponding to the wireless data user to be analyzed on the base station side based on the information of the base station, thus to improve the service quality of the wireless network and realize reasonable resource distribution.

According to one aspect of the disclosure, a method for classifying wireless data service is provided, comprising setting a service model of a relationship for matching wireless call information with service types, calculating Key Performance Indicators KPIs of the wireless call information, matching the calculated KPIs with the service model which is preset, and determining a service type of a call.

Before the steps above, the method further comprises collecting the wireless call information of users, carrying out a preliminary analysis of the wireless call information collected and filtering abnormal calls.

The service types comprise: a service type of downloading, a service type of burst transfer with a high rate, a service type of burst transfer with a low rate, a service type of forward reversal symmetry and a service type of uploading.

The service model comprises a relationship between different KPI numerical intervals and the service types.

Determining the service type of the call comprises: matching the KPIs of the wireless call information collected with the KPI numerical value intervals in the service model, if the KPIs of the wireless call information collected fall in any one of the KPI numerical value intervals, the matching is successful and a service type corresponding to the KPI numerical value intervals is the service type of the call, otherwise the service type of the call is the other type.

The KPIs of the wireless call information collected at least comprises two KPIs.

Preferably, the method comprises: if the KPI numerical value intervals in which the KPIs of the wireless call information collected fall are two or more, the service type of the call is determined according to the priority of the service types which is preset.

Preferably, the method comprises: matching a corresponding relationship of the service types determined according to the service model with IP network application types.

Preferably, the method comprises: according to combination conditions which are preset, co-processing calls whose service types have been determined, wherein the combination conditions comprise: calls belong to one user, and/or calls belong to one service type, and/or calls belong to one cell; and the time interval of two adjacent calls is shorter than a time threshold which is preset.

To realize the object above, according to another aspect of the disclosure, a device for classifying wireless data service is provided, comprising a user call information collecting module, configured to collect call information of wireless data service users and carry out a preliminary analysis of the call information; a call information Key Performance Indicator KPI calculation module, configured to calculate Key Performance Indicators KPIs of the call information; and a service type matching module, configured to determine a service type of the call information by matching the call information with service types, and determine a IP network application type of the call information by matching the service type determined with IP network application types.

Preferably, the device further comprises a co-processing module, configured to co-process the call information classified according to call combination conditions which are preset.

From the technical solution provided in the disclosure, a model is set for matching the wireless call information with the IP network application types, and the actual network application types of the call are classified according to the KPIs of the user call information. The actual IP service type of the user may be quickly and accurately differentiated without increasing the system load on a base station side or on a core network side, so that the service quality of the wireless network is improved and the resource is distributed reasonably.

DETAILED DESCRIPTION OF THE EMBODIMENTS

The preferred embodiments are described in conjunction with the drawings as follows. It shall be understood that the embodiments of the present application and the features of the embodiments can be combined with each other if there is no conflict.

Figure 1:
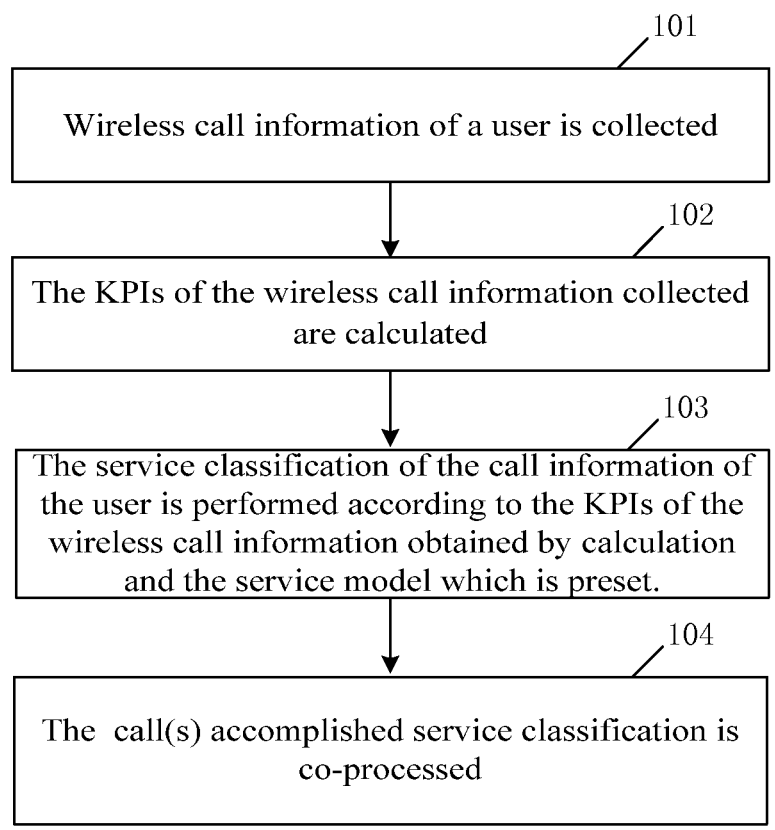
FIG. 1 is a flow diagram of a method for classifying wireless data service according to the disclosure.

FIG. 1 is a flow diagram of a method for classifying wireless data service according to the disclosure, as shown in FIG. 1, the method includes the following steps.

Step 101: wireless call information (also known as wireless call record) of a user is collected, wherein the wireless call information is generated in wireless data service.

The step of collecting the wireless call information of the user may be conducted on a base station side, wherein the wireless call information includes information related to wireless environment, and/or information related to base station's loads, and/or information related to the power, and/or information related to air interface connection, etc, which are generated in the user's calling process.

Furthermore, after the wireless call information of the user is collected on the base station side, a preliminary analysis of the wireless call information collected is carried out, which is mainly to filter abnormal call(s) coming out possibly in the user's calling process, Preferably, a sample for reporting errors of connection time due to too short connection duration may come out in the user's calling process.

The realization of the step above is the conventional technical solution for those skilled in the field. The description of the specific realization is not for limiting the protection scope of the disclosure, and no details are given herein.

Step 102: the KPIs of the wireless call information collected are calculated.

In the present step, the corresponding KPIs are calculated according to the user's wireless call information collected.

Preferably, the step of calculating the KPIs of the wireless call information includes: calculating the KPIs (usually includes at least two KPIs) of the wireless call information. The KPIs may comprise effective rate duration ratio, forward reversal flux ratio, forward effective Intel protocol/radio link protocol (IP/RLP) rate, reverse effective IP/RLP rate, forward effective rate duration ratio and reverse effective rate duration ratio, etc.

Step 103: the service classification of the call information of the user is performed according to the KPIs of the wireless call information obtained by calculation and the service model which is preset.

In the above, the service model includes a relationship between the KPIs of the wireless call information and the service types. The relationship is used to classify the call information (also known as call record) of the user. Herein, different service types correspond to different KPI numerical value intervals of the wireless call information. The KPI numerical value intervals refer to the KPI numerical ranges which are used to determine different service types, and the service types may be set according to the different purposes.

In the above, the KPIs of the wireless call information at least include two KPIs. According to different KPIs and the corresponding KPI numerical value interval(s), equipment manufacturers or operators may set different service types according to their own demands. In the present step, the service types may be classified as a service type of downloading, a service type of burst transfer with a high rate, a service type of burst transfer with a low rate, a service type of forward reversal symmetry and a service type of uploading and other service type that may not be classified as the five service types above; correspondingly, the KPI numerical value intervals corresponding to the service types above may be set as: a numerical value interval of forward effective IP/RLP rate v1 and a numerical value interval of effective rate duration ratio t1 correspond to the service type of downloading; a numerical value interval of forward effective IP/RLP rate v2 and a numerical value interval of effective rate duration ratio t2 correspond to the service type of burst transfer with a low rate; a numerical value interval of forward effective IP/RLP rate v3 and a numerical value interval of forward reversal flux ratio c1 correspond to the service type of burst transfer with a low rate; a numerical value interval of forward reversal flux ratio c2 and a numerical value interval of reverse effective IP/RLP rate f1 correspond to the service type of forward reversal symmetry; a numerical value interval of forward reversal flux ratio c3 and the numerical value interval of reverse effective IP/RLP rate f2 correspond to the service type of uploading. In the above, the KPI numerical value intervals of the same KPI may be different, for example, v1, v2 and v3 are different from each other.

In the present step, the KPIs of the call information calculated in step 102 match the service model which is preset. If the KPIs calculated fall in the KPI numerical value interval(s) corresponding to any one of service types, the matching is successful; otherwise, the service type of the call is determined to be other service type.

Specifically, only when all the KPIs of the wireless call information of the user fall in the effective interval corresponding to a certain service type in the service model, the matching of the service model is successful. For example, the forward effective RLP rate of a call is 100 kbps which is less than the maximum of the forward effective RLP corresponding to the service type of burst transfer with a low rate and more than the minimum of the forward effective RLP corresponding to the service type of burst transfer with a low rate, so that the forward effective RLP rate meets the limit on rate by the service type. If other KPI numerical values fall in the KPI numerical value interval corresponding to the service type of burst transfer with a low rate as well, the call is judged to belong to the service type of burst transfer with a low rate.

Furthermore, if the KPIs of the wireless call information match with the KPI numerical value intervals corresponding to two or more service types, the method of the disclosure further includes: the service type of high priority is selected according to the priority of the service types which is set. In the above the priority of the service types may be set to be (from high to low): the service type of forward reversal symmetry, the service type of downloading, the service type of uploading, the service type of burst transfer with a high rate, the service type of burst transfer with a low rate and other service type. For example, if the KPIs of a call information not only fall in the KPI numerical value interval of the service type of forward reversal symmetry but also the KPI numerical value interval of the service type of downloading, the wireless call information is determined to be the service type of forward reversal symmetry according to the priority of the service types.

The present step further includes: after performing the service classification of the call information of the user, matching is performed according to the relationship between the service types determined by the service model and the IP network application types, wherein the matching includes: matching the KPIs of the wireless call information of the user with the service types in the service model to determine a service type, and performing the service classification according to the service type and the IP network application type, so that the actual service type of the user maybe differentiated accurately and quickly.

Preferably, the service of FTP continuous downloading, the service of forward videos and the service of BT downloading, etc. in the IP network application type correspond to the service type of downloading in the service model, The service of browsing websites, etc. correspond to the service type of burst transfer with a high rate in the service model; the service of network chat in real time, for example, MSN, QQ, etc., corresponds to the service type of burst transfer with a lower rate; the service of network calls, the service of video calls, the service of QQ videos, etc. correspond to the service type of forward reversal symmetry in the service model; the service of network files uploading and the service of email sending, etc. correspond to the service type of uploading in the service model.

Furthermore, the disclosure further comprises Step 104: the call(s) accomplished service classification is co-processed.

Specifically, the user's call(s) is co-processed according to combination conditions which are preset. In the embodiment, for the same call, the combination conditions may include: calls belong to one user, and/or one service type, and/or one cell; for the two adjacent calls, the combination conditions may be that the time interval from the release time of the first call to the establishment time of the second call is shorter than the preset time threshold which may be set according to the actual situation of the wireless data service.

Figure 2:
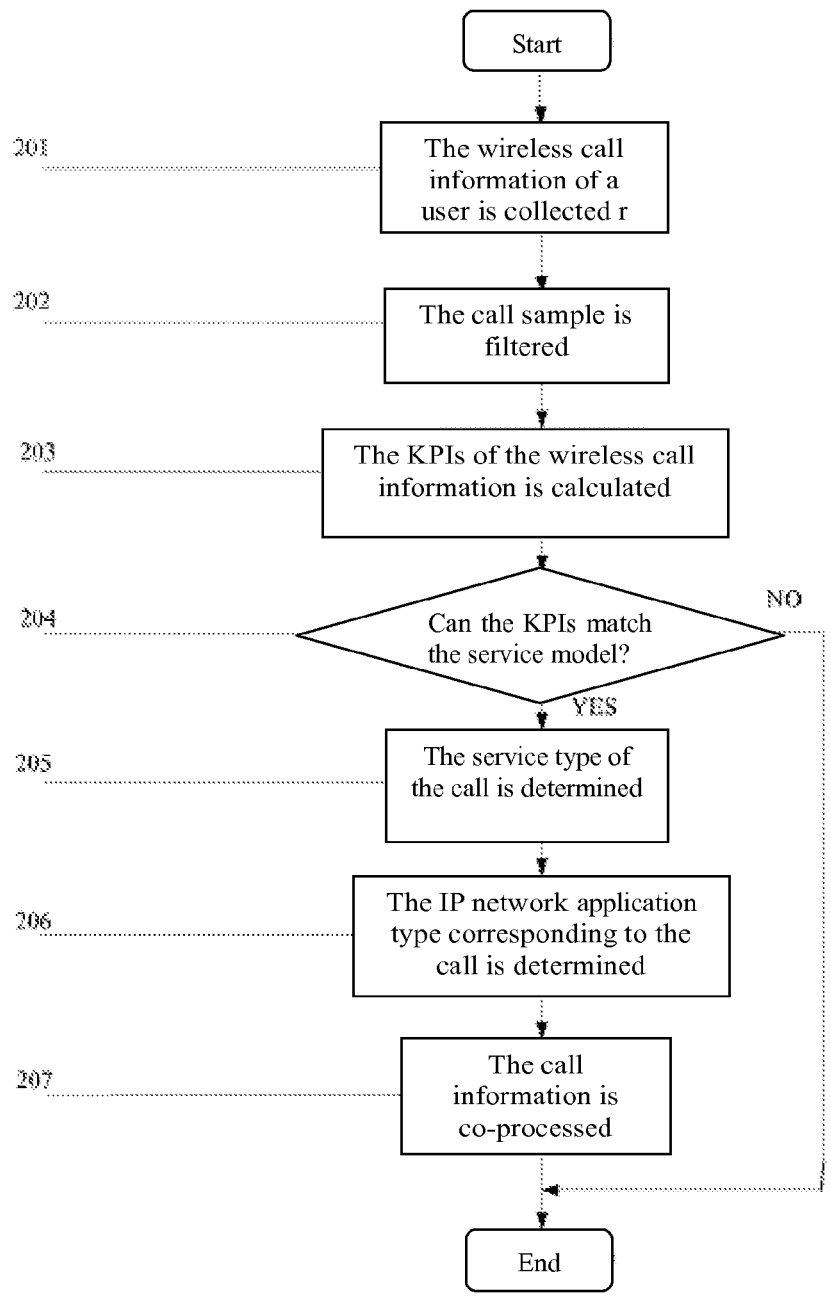
FIG. 2 is a flow diagram of a method for classifying wireless data service according to the embodiment of the disclosure.

FIG. 2 is a flow diagram of a method for classifying wireless data service according to the disclosure. As shown in FIG. 2, the method includes the following steps.

Step 201, the wireless call information of a user is collected, wherein the wireless call information includes information related to wireless environment, information related to base station loads, information related to the power control, information related to air interface connection, etc. The collection of the wireless call information may be done on the base station side.

Step 202, the call sample is filtered. A preliminary analysis of the wireless call information collected is carried out and the abnormal call(s) is filtered.

Step 203, the KPIs of the wireless call information is calculated, which is used for the follow-up operation of service classification.

Step 204, the KPIs of the wireless call information match with the service model. If the KPIs of the wireless call information fall in any one of the corresponding KPI numerical value interval preset in the service model, the matching is successful, and the Step 205 is performed, otherwise, the service type of the call is determined to be other service type.

Step 205, a specific service type of the call is determined according to the matching result of the service model. It shall be noted that for the call information may match with two or more service types at the same time, the service types maybe classified according to the following priority of the service types (from high to low): the service type of forward reversal symmetry, the service type of uploading, the service type of burst transfer with a high rate, a service type of burst transfer with a low rate and other service type.

Step 206, the IP network application type corresponding to the call is determined. The IP network application type of the call is determined according to the IP network application type corresponding to the service type.

Step 207, the call information is co-processed. The call(s) whose service type has been determined is co-processed.

Figure 3:
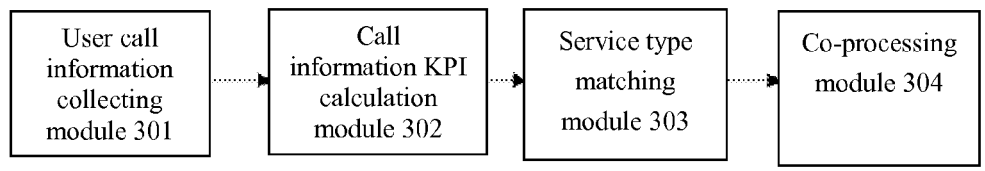
FIG. 3 is a structural diagram of a device for classifying wireless data service according to the disclosure.

FIG. 3 is a structural diagram of a device for classifying wireless data service according to the disclosure. As shown in FIG. 3, the device includes: a user call information collecting module 301, a call information KPI calculation module 302, a service type matching module 303 and a co-processing module 304.

The user call information collecting module 301 is configured to collect wireless call information of a wireless data service user, carry out a preliminary analysis of the call information and filter an abnormal call(s).

Preferably, the user call information collecting module may be embedded at a base station.

The call information KPI calculation module 302 is configured to calculate the KPIs of the wireless call information collected by the user call information collecting module 301.

The service type matching module 303, stored with a service model used to record the relationship between the service types and the KPI numerical value intervals, is configured to match the wireless call information obtained by calculation with the service model which is preset to determine a service type of the wireless call information, and match a corresponding relationship of the service type determined according to the service model with the IP network application types, determine a IP network application type of the call according to the IP network application types corresponding to different service types obtained.

In the above, the service model includes: determining the service type according to the preset KPI numerical value intervals of the wireless call information, wherein the preset KPI numerical value intervals refer to the KPI numerical ranges which are used to determine the different service types. The service types may be set according to different purposes. In the above, the KPIs of the wireless call information at least include two KPIs. Equipment manufacturers or operators may set different KPIs and different KPI numerical value intervals according to their own demands and classify different service types in the different KPI numerical value intervals.

The co-processing module 304 is configured to co-process the call(s) accomplished service classification according to the preset combination conditions. In the above, for the same call, the combination conditions may include: calls belong to one user, and/or one service type, and/or one cell; for the two adjacent calls, the combination conditions may be that the time interval from the release time of the first call to the establishment time of the second call is shorter than the preset time threshold which may be set according to the actual situation of wireless data service.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. A method for classifying wireless data service, comprising:
setting, by a base station, a service model of a relationship for matching wireless call information with service types, wherein the service model comprises a relationship between different KPI numerical value intervals and the service types;

calculating Key Performance Indicators KPIs of the wireless call information, matching the calculated KPIs with the service model which is preset, and determining a service type of a call; and the step of determining the service type of the call comprises: matching the KPIs of the wireless call information collected with the KPI numerical value intervals in the service model, if the KPIs of the wireless call information collected fall in any one of the KPI numerical value intervals, the matching is successful and a service type corresponding to the KPI numerical value intervals is the service type of the call; and wherein if the KPI numerical value intervals in which the KPIs of the wireless call information collected fall are two or more, the method further comprises: determining the service type of the call according to the priority of the service types which is preset.

2. The method for classifying wireless data service according to claim 1, wherein before the steps in claim 1, the method further comprises: collecting the wireless call information of users.

3. The method for classifying wireless data service according to claim 2, wherein after the step of collecting the wireless call information of users and before the step of calculating the KPIs of the wireless call information, the method further comprises: carrying out a preliminary analysis of the wireless call information collected and filtering abnormal calls.

4. The method for classifying wireless data service according to claim 1, wherein the service types comprise: a service type of downloading, a service type of burst transfer with a high rate, a service type of burst transfer with a low rate, a service type of forward reversal symmetry and a service type of uploading.

5. The method for classifying wireless data service according to claim 1, wherein the KPIs of the wireless call information collected at least comprises two KPIs.

6. The method for classifying wireless data service according to claim 1, wherein if the matching is unsuccessful, the method further comprises determining the service type of the call to be other type.

7. The method for classifying wireless data service according to claim 1, wherein after performing the service classification of the wireless call information of the users, the method further comprises: matching a corresponding relationship of the service types determined according to the service model with IP network application types.

8. The method for classifying wireless data service according to claim 1, wherein the method further comprises: according to combination conditions which are preset, co-processing calls whose service types have been determined.

9. The method for classifying wireless data service according to claim 8, wherein the combination conditions comprise:

calls belong to one user, and/or calls belong to one service type, and/or calls belong to one cell; and the time interval of two adjacent calls is shorter than a time threshold which is preset.

10. A base station, comprising a processor configured to execute the following steps:

collect call information of wireless data service users and carry out a preliminary analysis of the call information;

calculate Key Performance Indicators KPIs of the call information;

record a relationship between service types and KPI numerical value intervals, and determine a service type of the call information by matching the calculated KPIs with the service model, and determine an IP network application type of the call information by matching the service type determined with IP network application types, wherein the service model comprises a relationship between different KPI numerical value intervals and the service types; and match the KPIs of the wireless call information collected with the KPI numerical value intervals in the service model, determine that a service type corresponding to the KPI numerical value intervals is the service type of the call if the KPIs of the wireless call information collected fall in any one of the KPI numerical value interval, and determine the service type of the call according to the priority of the service types which is preset if the KPI numerical value intervals in which the KPIs of the wireless call information collected fall are two or more.

11. The base station according to claim 10, wherein the base station co-processes the call information classified according to call combination conditions which are preset.

12. The method for classifying wireless data service according to claim 2, wherein the service types comprise: a service type of downloading, a service type of burst transfer with a high rate, a service type of burst transfer with a low rate, a service type of forward reversal symmetry and a service type of uploading.

13. The method for classifying wireless data service according to claim 3, wherein the service types comprise: a service type of downloading, a service type of burst transfer with a high rate, a service type of burst transfer with a low rate, a service type of forward reversal symmetry and a service type of uploading.

14. A method for classifying wireless data service, comprising:

setting, by a base station, a service model of a relationship for matching wireless call information with service types;

co-processing calls whose service types have been determined according to combination of conditions which are preset, wherein the combination conditions comprise:

calls belong to one user, and/or calls belong to one service type, and/or calls belong to one cell; and the time interval of two adjacent calls is shorter than a time threshold which is preset; and calculating Key Performance Indicators KPIs of the wireless call information, matching the calculated KPIs with the service model which is preset, and determining a service type of a call.

15. The method for classifying wireless data service according to claim 14, wherein before the steps in claim 14, the method further comprises: collecting the wireless call information of users.

16. The method for classifying wireless data service according to claim 15, wherein after the step of collecting the wireless call information of users and before the step of calculating the KPIs of the wireless call information, the method further comprises: carrying out a preliminary analysis of the wireless call information collected and filtering abnormal calls.

17. The method for classifying wireless data service according to claim 14, wherein the service types comprise:

a service type of downloading, a service type of burst transfer with a high rate, a service type of burst transfer with a low rate, a service type of forward reversal symmetry and a service type of uploading.

18. The method for classifying wireless data service according to claim 14, wherein:
- the service model comprises a relationship between different KPI numerical value intervals and the service types; and
- the step of determining the service type of the call comprises matching the KPIs of the wireless call information collected with the KPI numerical value intervals in the service model, if the KPIs of the wireless call information collected fall in any one of the KPI numerical value intervals, the matching is successful and a service type corresponding to the KPI numerical value intervals is the service type of the call.

19. The method for classifying wireless data service according to claim 18, wherein the KPIs of the wireless call information collected at least comprises two KPIs.

20. The method for classifying wireless data service according to claim 18, wherein if the matching is unsuccessful, the method further comprises determining the service type of the call to be other type.

* * * * *